United States Patent [19]

Brandau et al.

[11] 4,156,406
[45] May 29, 1979

[54] INTERNAL COMBUSTION ENGINE GAS-OIL SEPARATOR

[75] Inventors: Steven G. Brandau; Larry D. Shinn, both of Cedar Falls, Iowa

[73] Assignee: Deere & Company, Moline, Ill.

[21] Appl. No.: 835,494

[22] Filed: Sep. 22, 1977

[51] Int. Cl.² .................. F02N 25/06; F07T 9/00; F17K 15/00
[52] U.S. Cl. .................... 123/41.86; 55/442; 55/445; 123/119 B
[58] Field of Search ............ 123/119 B, 41.86; 55/442, 443, 444, 445, 446

[56] References Cited

U.S. PATENT DOCUMENTS

| | | | |
|---|---|---|---|
| 3,166,061 | 1/1965 | Weiser | 123/119 B |
| 3,469,565 | 9/1969 | Weber et al. | 123/119 B |
| 3,509,967 | 5/1970 | Ballard | 123/119 B |
| 3,542,002 | 11/1970 | Miles | 123/119 B |
| 3,633,558 | 1/1972 | Stade et al. | 123/119 B |
| 3,645,243 | 2/1972 | Ohlsson | 123/119 B |
| 3,779,221 | 12/1973 | Gartner | 123/119 B |
| 3,875,916 | 4/1975 | Patton | 123/119 B |
| 3,877,451 | 4/1975 | Lipscomb | 123/119 B |
| 4,011,846 | 3/1977 | Gagliardi | 123/119 B |

*Primary Examiner*—Wendell E. Burns

[57] ABSTRACT

A gas-oil separator includes a bowl shaped housing open to the bottom for mounting to the rocker arm cover of an internal combustion engine. The housing and an encircling gasket at the bottom is secured to the rocker arm cover by a pair of bolts passing through the top of the housing and threaded to a clamp plate positioned inside of the rocker arm cover. First, second, and third baffles are secured to the clamp plate and sequentially spaced therefrom so as to be disposed within the housing. The clamp plate contains a pair of openings for the flow of mixed engine blow-by gases and oil, and a pair of holes for exit of the separated oil; the housing contains an outlet port proximate the top for the exhaust of the separated blow-by gases. The first baffle plate contains three openings which are completely out of line with the two openings in the clamp plate. The second baffle plate contains a pair of openings which are in line with the openings in the clamp plate and out of line with the openings in the first baffle plate. The third baffle plate contains three openings which are in line with the openings in the first baffle plate and completely out of line with the openings in the clamp plate and the second baffle plate. The openings are positioned so as to cause impactive precipitation of the oil on all three baffle plates and to cause complete retroversions of flow for centrifugal precipitation around the first and second baffle plates and sedimentary precipitation between each of the baffle plates and above the third baffle plate.

5 Claims, 4 Drawing Figures

INTERNAL COMBUSTION ENGINE GAS-OIL SEPARATOR

BACKGROUND OF THE INVENTION

The present invention relates generally to apparatus for separating oil and contaminants from gas-oil mixtures and in particular relates to combustion gas-oil contaminant separators for use with internal combustion engines. During operation of an internal combustion engine, combustion gases blow-by past the piston rings and enter the engine crank case and be vented to prevent seal damage. Also engine oil is mixed with the combustion gases by the reciprocation and rotation of the engine components must be separated prior to venting to prevent oil carryover into the atmosphere.

In the past, high efficiency gas-oil separators have been very expensive and inexpensive systems have not been of high efficiency.

SUMMARY OF THE INVENTION

The present invention provides a separator which utilizes a series of three baffles in a housing secured to the engine rockshaft cover by a clamp plate to cause precipitation of the oil contaminants by utilizing three separate principles of precipitation. Due to the arrangement of the openings in the clamp plate and baffles, impactive precipitation occurs against all baffles; due to the number and sizing of the openings, sedimentary precipitation occurs due to velocity reductions at the first and third baffle plates; and centrifugal precipitation occurs due to flow retroversion around the first and second baffle plates. Further sedimentary precipitation occurs between the third baffle plate and the housing before the final exit of the gas from the housing.

The above and additional advantages of the present invention will become apparent to those skilled in the art from a reading of the following detailed description when taken in conjunction with the accompanying drawings.

DESCRIPTION OF THE PREFERRED EMBODIMENT

Figure 1:
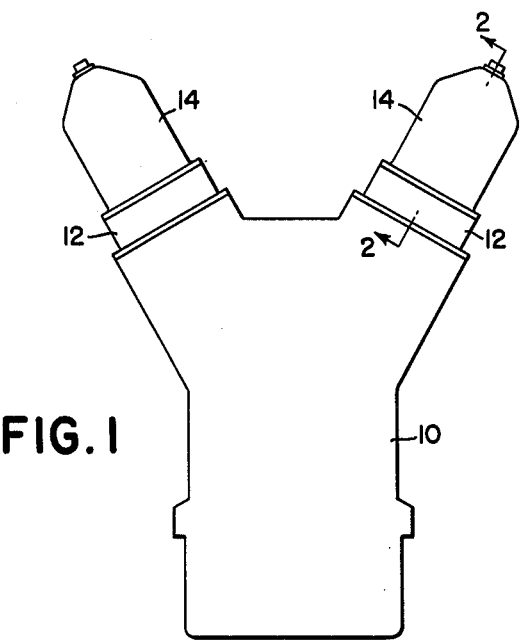
FIG. 1 is a front view of an internal combustion engine upon which the preferred embodiment of the present invention is mounted.

Referring now to FIG. 1, therein is shown a conventional internal combustion engine 10 having rocker arm covers 12 with gas-oil separators 14 secured thereto.

Referring now to the remaining drawings, therein is shown one of the two gas-oil separators 14 which is made up of a generally bowl-shaped housing 16 which is open to a planar, or flat, bottom. Proximate the top of the housing 16 is an outlet port 18 which connects the interior and exterior of the housing 16. The housing 16 along with a gasket 20 is secured to an inclined surface of thethe rocker arm cover 12 by a clamp plate 22 which is disposed within the rocker arm cover 12. The clamp plate 22 has welded thereto a pair of U-shaped brackets 24 which extend through an opening in the top of the rocker arm cover 12. A pair of bolts 26 extend through a pair of holes in the housing 16 to threadably engage the pair of U-shaped brackets 24.

Positioned above the clamp plate 22 are first, second, and third baffle plates 28, 30, and 32 which are sequentially spaced from the clamp plate 22. The clamp plate 22 contains a pair of oval inlet openings 34, a pair of drain holes 36, and a locating opening 38 for engagement with a locating tab 40 which is a bent down portion of the rocker arm cover 12. The oval inlet openings 34 are sized to provide an inlet flow velocity of the entering gas-oil mixture below an experimentally determined two meters per second.

The first baffle plate 28 contains three side-by-side slot openings 42 which are out of line with the openings 34 in the clamp plate 22. Each of the openings 42 has downturned lip 42a about its periphery and the outer two openings 42 include an extension on the downturned lip which form spacing lips 42b which position the first baffle plate 28 in spaced relationship with the clamp plate 22.

The second baffle plate 30 contains a pair of slot openings 44 which are positioned out of line with the openings 42 in the first baffle plate 28 and in line with the pair of openings 34 in the clamp plate 22. Each of the openings 44 has a downturned lip 44a about its periphery and a portion with an extended downturned lip which forms spacing lips 44b.

The third baffle plate 32 is of identical configuration to the first baffle plate 28 and contains three slot openings 46 which are in line with the three openings 42 in the first baffle plate 28 and out of line with the openings 34 and 44 in the clamp plate 22 and the second baffle plate 30, respectively. The openings 46 are further encircled by downturned lips 46a and extended downturned lips 46b which act to space the third baffle plate 32 from the second baffle plate 30. The third baffle plate 32 is loaded toward the clamp plate 22 and is welded to the U-shaped brackets 24 so as to fix the spaced positions of the first and second baffle plates 28 and 30. In the assembled position, the first through third baffle plates 28 through 32 will be spaced from the housing 16 with a clearance that will allow oil drain-off to a pair of drain holes 36 in the clamp plate 22 due to the inclined positioning of the separator 14.

Figure 2:
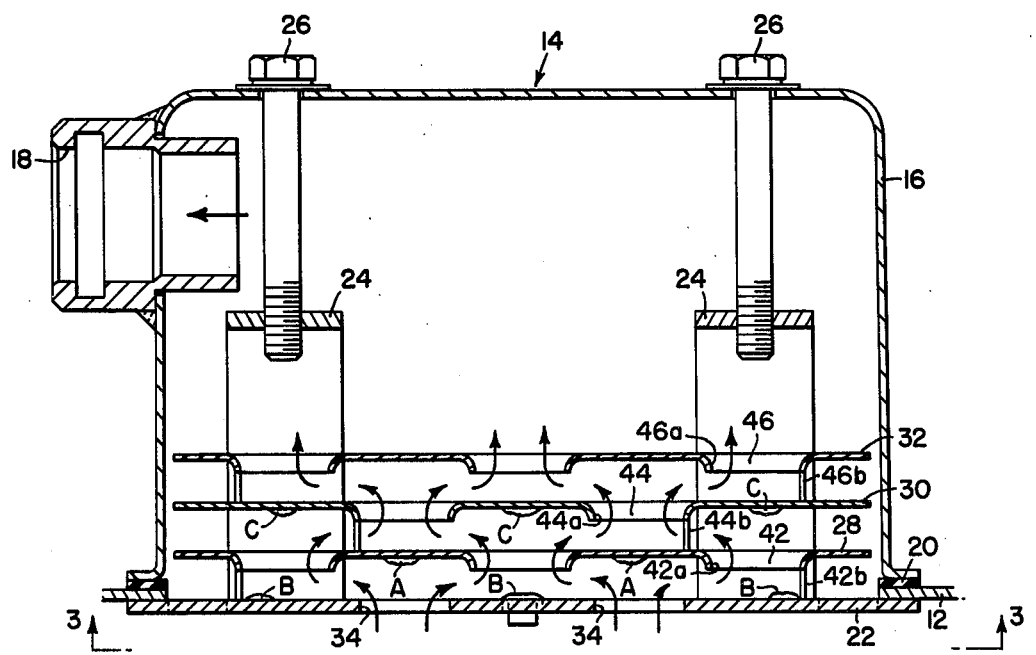
FIG. 2 is a cross-section along line 2—2 of FIG. 1.
Figure 3:
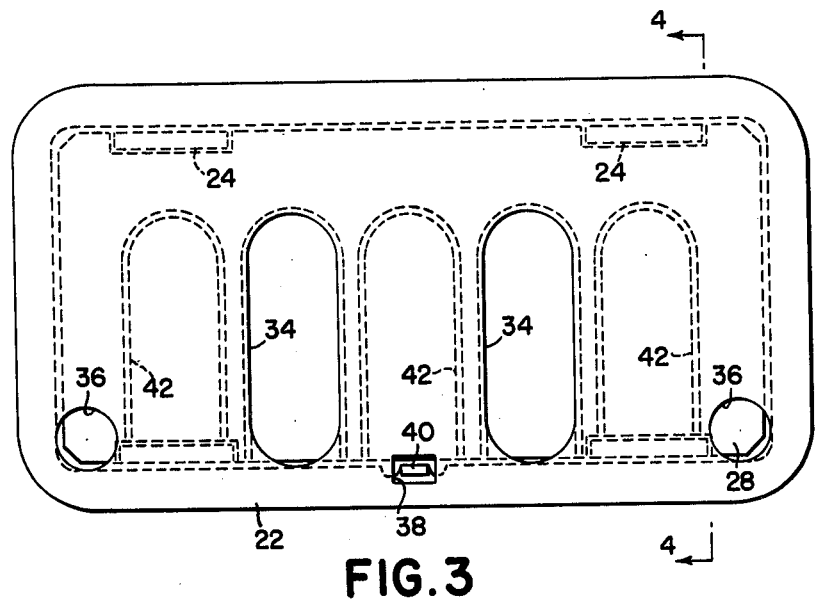
FIG. 3 is a bottom view looking up of FIG. 2 looking along line 3—3.
Figure 4:
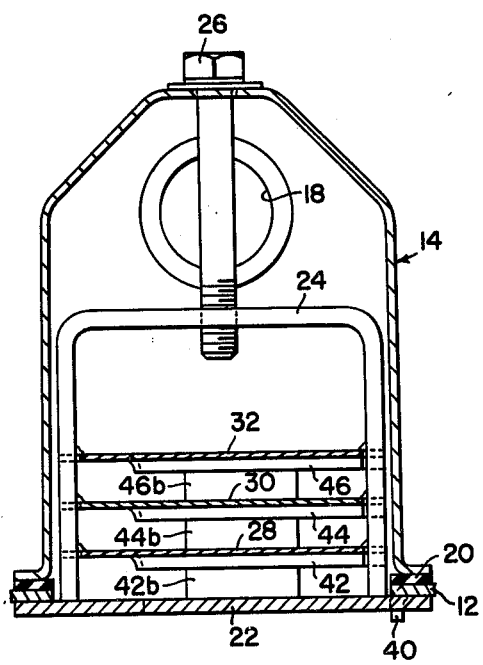
FIG. 4 is a cross-sectional view of the preferred embodiment taken along line 4—4 of FIG. 3.

During operation of the engine 10, combustion gases carrying carbon and other contaminants tend to blow by the piston rings and enter the engine crankcase. Due to the rotation of the engine crank and piston rods, the gases are mixed with engine lubricating oil to form a combustion gas-oil contaminant mixture. The mixture passes through the engine 10 up to the rocker arm covers 12 and then into each of the gas-oil separators 14 through the inlet openings 34 in the clamp plates 22. The mixture generally follows the paths indicated by the arrows in FIG. 2.

Taking one gas-oil separator 14 as being typical, as the mixture flows through the inlet openings 34, they first impact against the bottom of the first baffle plate 28 and the backs of the lips 42a. Due to the tilted position of the gas-oil separator 14 as shown in FIG. 1, the oil contaminants will be forced by gravity towards the edge of the first baffle plate 28 against the inside of the housing 16 from where it will run eventually down to the clamp plate 22 and back into the rocker arm cover 12 through the drain holes 36.

Since the openings 42 are out of line with the openings 34, the flow velocity of the mixture will be slowed as it divides to enter the openings 42. It should be noted at this point that the spacing lips 42b provide sufficient distance between the bottoms of the lips 42a and the clamp plate 22 to slow the flow velocity below an experimentally determined two meters per second for sedimentary precipitation. If the baffle plates are spaced too close together so as to exceed this flow velocity, there will be a noticeable carrythrough of oil out of the outlet port 18.

As the mixture exits the openings 42, it impacts against the bottom of the second baffle plates 30, since the openings 44 are out of line with the openings 42, to cause impactive precipitation of more oil contaminants against the underside of the second baffle plate 30 and the back side of the lips 44a at the points indicated by the letter A. Further since this impaction causes a substantial retroversion of flow around the first baffle plate 28, centrifugal precipitation will cause the accumulation of oil contaminants at the points marked by the letter B.

As the mixture enters the openings 44 in the second baffle plate 30, most of the contaminants are removed, but any remaining contaminants are then removed by impaction against the under side of the third baffle plate 32 and the back side of the lips 46a. As the flow enters the openings 46, the flow velocity is reduced again to flow two meters per second before being exhausted into the upper portion of the housing 16 above the third baffle plate 32. Further sedimentary precipitation occurs here before the combustion gas is ported out through the outlet port 18 at an experimentally determined flow velocity of less than one and a half meters per second.

Thus, a gas-oil separator is presented which provided impactive, centrifugal, and sedimentary precipitation of contaminants to separate combustion gases from oil contaminants. While the invention has been described in conjunction with a specific embodiment, it is to be understood that many alternatives, modifications, and variations will be apparent to those skilled in the art in light of the foregoing description. Accordingly, it is intended to embrace all such alternatives, modifications, and variations which fall within the spirit and scope of the appended claims.

We claim:

1. For mounting on the rocker arm cover of an internal combustion engine, a separator for separating a gas-contaminant mixture into separated gas and contaminants comprising: a bowl-shaped housing having a planar bottom opening for entry of a gas-contaminant mixture and drain of the separated contaminant, and having an opening proximate the top for exhaust of the separated gas; a first baffle plate disposed within the housing parallel to and spaced from the bottom opening, said first baffle plate having two openings provided therein for the passage of the gas contaminant mixture therethrough; a second baffle plate disposed within the housing parallel to and spaced above the first baffle plate so as to obtain a gas-contaminant mixture flow velocity below two meters per second for sedimentary precipitation of a first portion of the separated contaminants between the first and second baffle plates, said second baffle plate having an opening provided therein out of line with the openings in the first baffle plate for the passage of the gas contaminant mixtures therethrough after impactive separation of a second portion of the separated contaminants against said second baffle plate; a third baffle plate disposed within the housing parallel to and spaced above the second baffle so as to maintain a gas contaminant mixture flow velocity below two meters per second for sedimentary precipitation of a third portion of the separated contaminants between the second and third baffle plates, said third baffle plate having two openings provided therein out of line with the opening in the first baffle plate for the passage of the gas contaminant mixtures therethrough after impactive separation of a fourth portion of the separated contaminants against said third baffle plate whereby the gas contaminant mixture flow is substantially retroverted for centrifugal precipitation around the second baffle plate before entering the space between the third baffle plate and the top of the housing for sedimentary precipitation of the remaining portion of the separated contaminants from the gas-contaminant mixture and exhaust of the separated gas out of the opening in the top of the housing.

2. The separator as claimed in claim 1 wherein the opening in the top of the housing is sized to exhaust the gas at a flow velocity of less than one and a half meters per second.

3. The separator as claimed in claim 1 including a clamp plate disposed in the rocker arm cover for securing the housing to the rocker arm cover, said clamp plate having an opening provided therein out of line with the openings in the first baffle plate for the passage of the gas contaminant mixture therethrough to cause impactive separation of an additional portion of the separated contaminants against said first baffle plate and to cause retroversion of the gas contaminant mixture flow around the first baffle plate for centrifugal precipitation before entering the space between the first baffle plate and the clamp plate, said clamp plate parallel to and spaced from the first baffle plate so as to maintain a gas contaminant mixture flow velocity below two meters per second for sedimentary precipitation of a further portion of the separated contaminants between the clamp plate and the first baffle plate.

4. The separator as claimed in claim 1 wherein the first, second and third baffles include downwardly protruding edges around the periphery of the openings therein for aiding retroversion of the gas contaminant mixture and impactive precipitation thereof.

5. The separator as claimed in claim 1 wherein the first, second, and third baffles define means for directing the separated contaminants towards the opening in the bottom of the housing.

* * * * *